(12) United States Patent
Fu et al.

(10) Patent No.: US 8,046,248 B2
(45) Date of Patent: Oct. 25, 2011

(54) IDENTIFYING ITEMS THAT HAVE EXPERIENCED RECENT INTEREST BURSTS

(75) Inventors: Yun Fu, Sunnyvale, CA (US); Zhichen Xu, San Jose, CA (US); Liang-Yu (Tom) Chi, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1307 days.

(21) Appl. No.: 11/644,848

(22) Filed: Dec. 21, 2006

(65) Prior Publication Data

US 2008/0155465 A1 Jun. 26, 2008

(51) Int. Cl.
*G06Q 10/00* (2006.01)
(52) U.S. Cl. ...................................................... 705/7.11
(58) Field of Classification Search .................... 707/104
See application file for complete search history.

(56) References Cited

U.S. PATENT DOCUMENTS

| | | | | |
|---|---|---|---|---|
| 6,078,928 A | * | 6/2000 | Schnase et al. | 1/1 |
| 6,108,637 A | * | 8/2000 | Blumenau | 715/204 |
| 6,925,442 B1 | * | 8/2005 | Shapira et al. | 705/10 |
| 7,421,458 B1 | * | 9/2008 | Taylor et al. | 1/1 |
| 2002/0019763 A1 | * | 2/2002 | Linden et al. | 705/10 |

* cited by examiner

*Primary Examiner* — Romain Jeanty
*Assistant Examiner* — Luis Santiago
(74) *Attorney, Agent, or Firm* — Hickman Palermo Truong & Becker LLP

(57) ABSTRACT

Techniques are described for identifying items that have recently undergone an interest burst. Items that have recently undergone an interest burst are identified by comparing how many interest-actions have been performed on the items during a current time window against how many interest-actions have been performed on the items historically. Various tests are performed to rule out candidates that are not likely to be of interest to other users. In addition, various spam detection techniques are described for reducing the possibility that the items that are listed as interest burst items are listed because of spam.

42 Claims, 2 Drawing Sheets

IDENTIFYING ITEMS THAT HAVE EXPERIENCED RECENT INTEREST BURSTS

FIELD OF THE INVENTION

The present invention relates to detecting interest bursts and, more specifically, to identifying items that have recently experienced interest bursts.

BACKGROUND

Many types of electronic items are available over computer networks, such as the Internet. Such items include, for example, web pages, bookmarks, digital images, digital videos, etc.

Many users are interested in knowing what items are interesting to other users. Users may demonstrate an interest in an item in a variety of ways. An action that demonstrates an interest in an item is referred to herein as an interest-action.

The interest-actions that are performed by users to indicate an interest in an item often vary based on the nature of the item in which they are interested. For example, users may demonstrate an interest in a web page by retrieving the web page, following a link to the web page, creating pages that include links to the web page, bookmarking the web page, etc. As another example, users may demonstrate an interest in a tag by tagging other items (such as web pages, photos, videos) with the tag. With respect to videos, users may demonstrate an interest by following links to the videos, playing the videos or downloading the videos. These are merely some examples of the various items in which a user may be interested, and the types of ways that interests may be demonstrated.

The degree to which users have demonstrated interest in an item is generally referred to herein as the popularity of the item. The popularity of an item may be determined by counting how many interest-actions are performed relative to the item. Once the popularity of an item has been determined, the popularity may be used as a factor in a variety of contexts. For example, a search engine may use the popularity of items as a factor in determining how to rank search results that list the items.

In addition to knowing what items are historically interesting to other users, some users are particularly interested in knowing what items have recently become interesting to other users. In other words, users are interest in knowing what items have recently experienced an "interest burst". Such items are referred to herein as interest-burst items.

While the identity of interest-burst items may be interesting to users, determining which items qualify as interest-burst items at any given point in time may be difficult. Further, the value of any service that attempts to identify interest-burst items would be diminished if spammers are able to artificially generate interest bursts for items in which the general population is not interested.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
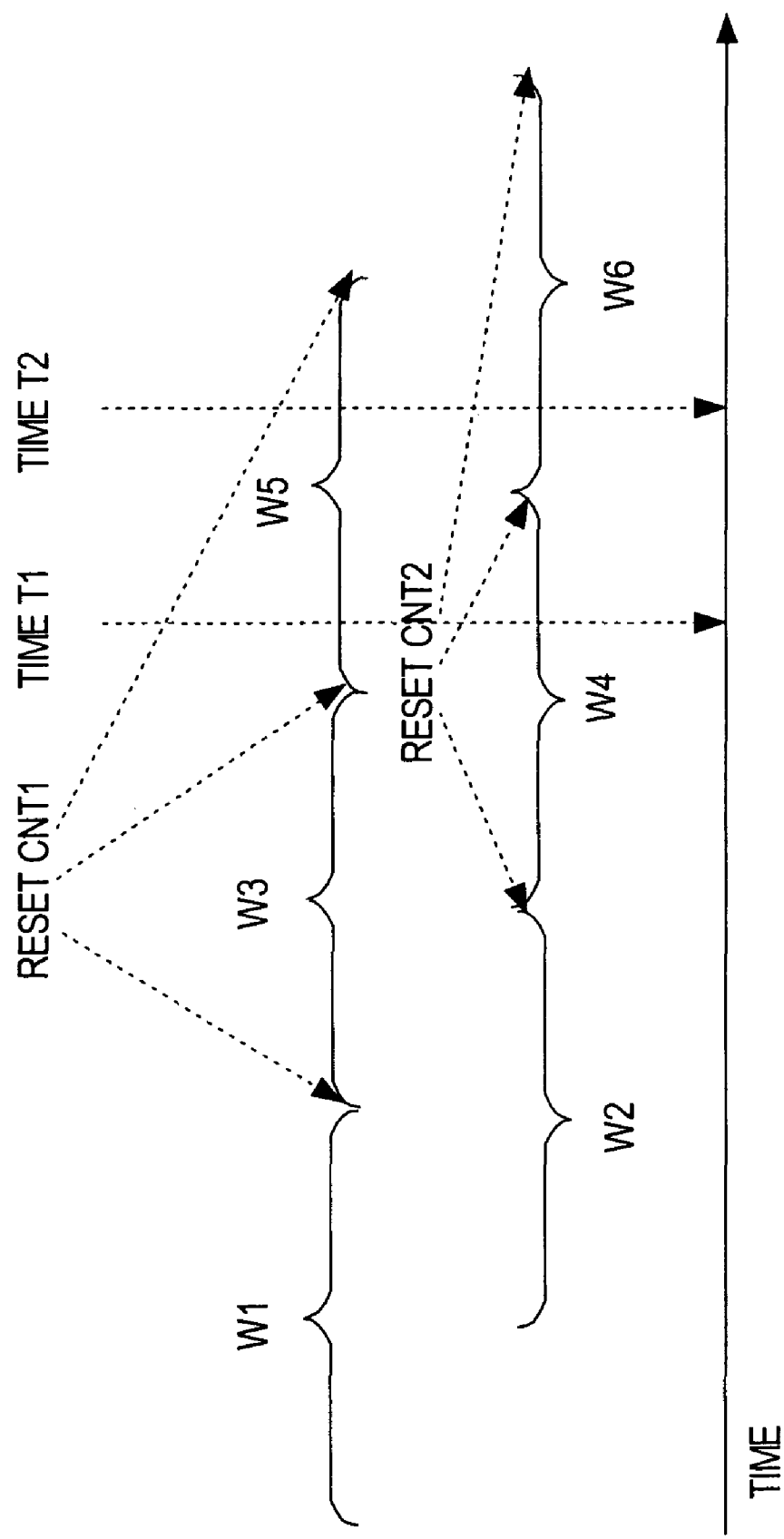
FIG. 1 is a block diagram illustrating overlapping time windows used to track interest-events for items, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Lifetime Counts and Window Counts

To determine the general popularity of an item, a system may maintain a lifetime count (LTC) of the interest-actions that are performed relative to the item. However, as explained above, the LTC of an item does not indicate whether there has recently been an interest burst relative to the item. Therefore, LTCs cannot be the sole basis for identifying interest burst items.

According to one embodiment, identifying interest burst items involves counting how many interest-actions are performed on the items during a target time window. The number of interest-actions that are performed relative to an item during the target time window is referred to as the window count (WC) of the item.

Identifying Interest Burst Item Candidates

Once both the LTC and WC have been determined, interest burst item candidates may be identified based on tests that involve the LTC and WC of the items. For example, according to one embodiment, an item is identified as a interest burst item candidate if the following tests are satisfied:

$$WC \geq \alpha LTC \hspace{4em} \text{TEST 1}$$

In Test 1, $\alpha$ is the portion of LTC that must occur within the target window for the item to qualify as an interest burst item. For example, if $\alpha$ is ⅕, then ⅕ of all interest-actions that have ever been performed on an item need to have been performed in the target window for the item to qualify as an interest burst item.

$$WC \geq WCmin \hspace{4em} \text{TEST 2}$$

In Test 2, WCmin is a minimum WC value for an item to qualify as a candidate. Test 2 filters out those items with low WCs that would otherwise be considered candidates simply because their LTCs are very low. For example, assume that, prior to the target window, only one user has performed an interest-action relative to a particular item, and that during the target window five users perform interest-actions relative to the particular item. In this example, the item underwent a relatively significant interest burst during the window, but the amount of interest that the entire population of users have demonstrated for the item is so low that most users would probably not want the interest item to be included in a list of interest burst items.

$$WC < WCmax \hspace{4em} \text{TEST 3}$$

In Test 3, WCmax is a maximum WC value for an item to qualify as a candidate. Test 3 filters out those items with WCs that are so high that there is a very high likelihood that their high WC is a result of spamming. Another test that can be used instead of or in addition to Test 3 is: $WC < \beta \, LTC$, where $\beta$ is a fraction of LTC that is so high (e.g. 9/10) as to indicate that WC is the result of spamming.

Private and Public Interest-Actions

In some contexts, it is possible for some interest-actions to be public, while others are private. For example, one type of interest-action that can be performed relative to web pages is saving a bookmark to the web pages. In some bookmarking services, bookmarks can be public or private. When a user saves a private bookmark, other users do not know that the user saved the bookmark. When a user saves a public bookmark, other users can see that the user saved the bookmark.

According to one embodiment, the private/public nature of interest-actions is taken into account when identifying interest burst item candidates. For example, WC and LTC may take into account only public interest-actions, only private interest-actions, or both. According to one embodiment, the following addition test is performed for items that have both public and private interest-actions:

$P > 0$          TEST 4

In Test 4, P is the number of public interest-actions for the item within the target window. By requiring at least one public interest-action within the target window, privacy "leaks" may be avoided.

Ranking Burst Item Candidates

Once interest burst item candidates have been identified using the tests described above, the candidates are ranked to determine which candidates are presented to users as interest burst items. According to one embodiment, the candidate items are ranked based on a score S, wherein S represents an estimate of the extra increase, within the current window, of interest in the item. S may be calculated in a variety of ways. According to one embodiment, S is computed according to the formula:

$$S = WC - (LTC - WC)/WIP,$$

which means the temporal increase WC within the target window, minus the average increase for a window in the past, (LTC−WC)/(WIP), where LTC−WC is the total number of interest-actions before the current window, and WIP is the number of windows before the current window.

Once S has been calculated for interest burst item candidates, the interest burst item candidates are sorted based on S, and the N top items are selected to be identified to users in a list of interest burst items.

Target Windows

Using the techniques described above, the interest burst items for a given target window may be identified and presented to users. However, the older the target window upon which the interest burst item list is based, the less likely the interest burst items on the list will be interesting to users. Typically, users want to know which items other users are currently interested in, not which items users were interested in at some point in the past.

One way to ensure that the window used to create the interest burst item list is current is to dynamically generate the list at the time the list is to be presented to a user, and to define the window based on when the list is being generated. For example, assume that at time T1, a user requests a web page that is to include the list of interest burst items. Assume further that the window interval has been established to be one week. In response to the request, the server may dynamically generate the interest burst item list based on the time window of (T1−5 days) to T1.

Unfortunately, the overhead associated with dynamically generating interest burst items lists in this manner would be cost prohibitive. Specifically, the server would have to record the time at which each interest-action was performed, and determine on an item by item basis the number of interest-actions that occurred within the window (T1−5 days) to T1. Further, all of these calculations would have to be performed in response to every request.

Alternatively, the server may be configured to generate the interest burst item list on a periodic basis, store the list, and provide the stored list to users until a more current list is regenerated using the same process. For example, the window interval may be defined to be one week. At the end of each week, the list may be generated based on the interest bursts that occurred during that week. The list thus generated may be provided to all users until, at the end of the following week, a new list is generated.

Unfortunately, the value of the interest burst item list is diminished when the list is generated only once for every window. Users desire real-time identification of interest burst items, from the current time point.

Current and Next Windows

According to one embodiment, the server that is responsible for generating the interest burst item list interleaves the starting and ending times of time windows so that any given point of time belongs to two time windows. An example of series of time windows interleaved in this manner is illustrated in FIG. 1.

Referring to FIG. 1, it illustrates a timeline that includes six time windows, W1, W2, W3, W4, W5 and W6. The time windows overlap such that any given point in time falls into two windows. For example, time T1 falls into windows W4 and W5. Time T2 falls into windows T5 and T6.

Of the two time windows that are active at the time the interest burst item list is generated, the time window with the earlier starting time treated by the server as the "current" window, and the time window with the later starting time is treated by the server as the "next" window. Thus, at time T1, W4 is the current window and W5 is the next window. At time T2, W5 is the current window and W6 is the next window.

As shall be described in greater detail hereafter, the server maintains an interest-action count for each item for each window. For any given item, the interest-action count for the current window is used as the WC for the item. The interest-action counts for the next window are maintained so that when the next window becomes the current window, the interest-action counts already reflect the interest-actions that occurred (1) after the window started, and (2) before the window became the current window.

Interest-Action Count Sets

According to one embodiment, two sets of interest-action counts are concurrently maintained by the server that is responsible for generating the interest burst item list. For the purposes of explanation, the two sets shall be referred to herein as the CNT1 set and the CNT2 set. At any given time, one of the two count sets is associated with the current window, and the other of the two count sets is associated with the next window.

For each item, the server maintains a value for each count set. Specifically, the CNT1 set will contain, for each item, a value that indicates how many interest-actions have been performed relative to the item during the time window associated with the CNT1 count set. Similarly, the CNT2 set will contain, for each item, a value that indicates how many interest-actions have been performed relative to the item during the time window associated with the CNT2 count set.

Since both count sets are always associated with active windows (either the "current" window or the "next" window), both counts are incremented for an item when an interest-action is performed relative to the item. As shall be described in greater detail hereafter, all values in a count set are reset when the count set is assigned to a new window. Thus, because the two count sets are assigned to windows at different times, the CNT1 value for a given item may differ from the CNT2 value for the same item.

Window Transitions

As explained above, each active time window is associated with one of the two count sets. During the period in which a time window is considered to be the "current" window, the values in the count set associated with the window are used as the WCs to determine the interest burst items. For example, assume that CNT1 set is associated with window W1 and CNT2 set is associated with window W2. While W1 is the "current" window, values from the CNT1 set are used as the WCs to determine interest burst items. When W1 ends, W2 becomes the new current window, and CNT2 values are used as the WCs to determine burst interest items.

When the "current" time window ends, a new time window starts. However, the new time window does not immediately become the "current" time window. Rather, the "next" time window, which has already begun at the time the "current" time window ends, becomes the new current time window. For example, just before W1 ends and W3 begins, W1 is the current window and W2 is the next window. At the time W1 ends and W3 begins, W2 becomes the current window and W3 becomes the next window.

The ending of one time window and the beginning another time window is referred to herein as a "window transition". According to one embodiment, the following actions are performed at each window transition:

The count set associated with the current window, which is ending, is reset and reassigned to the starting window;

The next window becomes the new current window; and

The newly starting window becomes the new next window.

For example, while W1 and W2 are active, the state of the system is as follows:

| Current Window | W1 |
| Count Set Associated with Current Window | CNT1 |
| Next Window | W2 |
| Count Set Associated with Next Window | CNT2 |
| WCs determined by values in | CNT1 |

However, after the window transition from W1 to W3, the state of the system is as follows:

| Current Window | W2 |
| Count Set Associated with Current Window | CNT2 |
| Next Window | W3 |
| Count Set Associated with Next Window | CNT1 (reset) |
| WCs determined by values in | CNT2 |

In the example illustrated in FIG. 1, the CNT1 set is initially assigned to W1. When W1 ends and W3 begins, the CNT1 set is reset and assigned to W3. Similarly, when W3 ends and W5 begins, the CNT1 set is reset and assigned to W5.

On the other hand, the CNT2 set is initially assigned to W2. When W2 ends and W4 begins, the CNT2 set is reset and assigned to W4. When W4 ends and W6 begins, the CNT2 set is reset and assigned to W6.

Significantly, when the values from a given count set start to be used as WCs to determine the interest burst items, the values already reflect a significant amount of recent activity. Consequently, the interest burst item lists produced by the counts are less likely to reflect the anomalies that can be produced by using in insufficient sampling size of activity.

While examples are given in which two windows overlap at any given time, alternative embodiments may define any number of concurrently overlapping windows. For example, a system may have seven concurrent week-long windows, each of which start/end on a different day of the week. Each of the seven windows would be associated with a distinct count set. Each of the seven windows would become the current window the day before the window ends. For example, a window that starts on a Saturday would become the current window on the following Friday, and would end on the following Saturday. Similarly, a window that starts on a Sunday would become the current window on the following Saturday (at the time the previous Saturday window ends), and would end on the following Sunday.

Lazy Maintenance of Count Values

Count values for a count set may be stored in a variety of ways. According to one embodiment, the server that is responsible for generating the activity burst item list maintains a table CNT_TAB for storing the count values. The CNT_TAB table may include, for example, an item_id column for storing values that identify an item (e.g. URLs), a CNT1 column for storing values for the CNT1 set, and a CNT2 column for values for the CNT2 set. Each row in the table would identify an item, and indicate the CNT1 and CNT2 values for the item.

As mentioned above, the values in a count set are reset when the count set is assigned to a new window. Thus, when CNT1 is assigned from W1 to W3, all values in the CNT1 column of the CNT_TAB may be reset to zero. Similarly, when CNT2 is assigned from W2 to W4, all of the values in the CNT2 column of CNT_TAB may be reset to zero.

Unfortunately, it may be impractical to proactively reset all of the values in a count set in response to a window transition. Such a reset operation may involve updating every row of the CNT_TAB table, which may have millions of rows. Therefore, according to one embodiment of the invention, the count values are lazily maintained. Specifically, the values in the count column of a row are only reset, as needed, when the count values need to be incremented to record an interest-action related to the item that is associated with the row.

To facilitate the lazy maintenance of the CNT_TAB table, a "LM" column is added to the table to store "last modified"

times. In such an embodiment, the server performs the following actions in response to an interest-action being performed for a particular item:

Locate the row for the particular item

Determine whether the last modified time stored in the row is within the current window If the last modified time stored in the row is not within the current window, then reset the values in both CNT1 and CNT2

If the last modified time is within the current window, determine whether the last modified time is within the next window If the last modified time is not within the next window, then reset the greater of CNT1 and CNT2

Increment the values in both CNT1 and CNT2

Store the current time as the last modified time

When the count values are maintained in this manner, the WC values that are used to identify interest burst candidates may be determined as follows:

if the last modified time for an item is not within the current window, then the WC for the item is zero if the last modified time for an item is within the current window, then the WC for the item is the greater of the values in the CNT1 and CNT2 columns.

Page Save Example

For the purpose of illustration, consider a situation in which the items are pages, and the interest-actions are saving and removing bookmarks to the pages (where removing a bookmark is treated as a negative interest-action). Assume further that SW1, SW2, and SW3 are the starting times of windows W1, W2 and W3, and that I represents the duration of each window.

If t is in [SW1, SW3), then the server uses counter CNT1 as the number of saved pages for the current window. If t is in [SW3, SW3+I/2), then the server uses counter CNT2 as the number of saved pages for the current window. In this way, the server always uses the counter that accumulates more than half a window of saves as an estimate of the actual real-time saves of the current window since t−I.

When a user saves or removes a page, the server updates both CNT2 and CNT1. For each URL, the server also tracks the last time that a user saves or removes the page, LMT, which is also the last modification time of CNT2 and CNT1.

According to one embodiment, when a user saves a page, the server updates CNT2, CNT1 of the URL according to the following logic:

CNT2=CNT2+1, if LMT≧SW1; otherwise, 1

CNT1=CNT1+1, if t<SW3 and LMT≧SW2, or if t≧SW3 and LMT≧SW3; Otherwise, 1.

The case that CNT2 or CNT1 is assigned with 1 is when the first save happens in the window.

Correspondingly, the server updates CNT2 and CNT1 as follows when a user removes a page, CNT2=CNT2−1, if LMT≧SW1; otherwise, 0

CNT1=CNT1−1, if t<SW3 and LMT≧SW2, or if t≧SW3 and LMT≧SW3; Otherwise, 0.

Spam Detection

A list of interest burst items is only useful if the items on the list are items that experienced actual bursts of interest among the user population. If items appear on the list because of artificially created "interest bursts" by a few spammers, it is not likely that users will find the list useful. Therefore, according to one embodiment, prior to ranking the interest burst item candidates, the WC of each interest burst item candidates is adjusted based on whether the interest-actions for the item are the result of spam.

According to one embodiment, various types of spam detection are performed, including a) spammer detection, b) co-spamming detection, and c) spam page detection. Each of these types of spam detection shall be described in greater detail hereafter. For the purpose of explanation, spam detection shall be described in the context where the items are pages, and the interest-actions are saving (or bookmarking) the pages. However, the spam detection techniques may be used to detect dubious interest-actions in any context.

In response to determining that an interest-action for a particular item is the result of spam, the server may decrement the WC of the item, making it less likely that the item will be ranked sufficiently high to be included in the interest burst item list. If a sufficient percentage of interest-actions in an item are determined to be the result of spam, then the item may simply cease to be considered as a candidate for the list.

Single-User Interest Spam

According to one embodiment, the server first checks each individual user who saved a page U by considering the following cases:

1. New user spammers: If a user just starts to use the system less than a specified time period (1 week or 2 weeks), the server may exclude the user from the save counting in case this is a new pseudo ID. If most savers of a URL are new users, then the server may consider U is possible a spam page.

2. Domain spammers: If a user saves a large number of pages from the same domain of U, then it is highly possible that the user intends to boost U. If most of savers of U are domain spammers, U is highly possible to be a spam page. One difficulty is users may obtain a significant amount of pseudo domains as well by some domain-hidden service. In that case, the server may use a whois service to detect the real register of the domains to see if they all belong to the same service.

3. Inactive users: Some spammers use a lot of user IDs to boost the same page. But for each ID, the spammer only saves one page. Thus, if a user rarely saves pages, the server may consider the user to be a spammer since the server lacks the user's history. If U is saved by multiple inactive users, U is probably a spam page.

4. Intensive saving users: although the server excludes those pages imported using bulk import tools, some spammers use scripts to automatically save a large amount of pages. Thus, the server inspects the arrival rate of these pages. If the arrival distribution is not natural, the user considers this user a spammer. For example, if the user saves a bunch of pages too fast and U is one of the pages he saved in this bunch, U is highly possible to be a spam page.

5. Intensive tagging users: if a user always tags a large number of tags to each page, this user is possibly attempting to spam the page.

Multi-User Interest Spam

Many spammers have to use multiple user IDs to save the same pages to spam popular pages. To detect these situations, the server compares most recent users who saved the page to detect if some of them are cooperating to spam.

1. Based on non-spammed popular pages, the server can observe the arrival rate of savers for a page and can thus inspect the arrival rate of the candidate page U. If most savers save U with an unusual arrival rate, e.g., too close to each other, the server assumes that these users are spamming the page.

2. Registration time: if most savers of a page register at the same week or start to use the service at the same time, they are possibly co-spamming.

3. ID similarity: Many spammers tend to use similar IDs, with some obvious literal patterns to save the same page.

4. Saving similarity: if savers of a page share a significant amount of common pages, tags, or domains, the server may consider them spammers.

5. Same IPs: if multiple savers of the same page are from the same IP, they are possibly spammers.

Content Factors in Spam Detection

In addition to reducing the WC of an item based on whether the users that performed the interest-actions on the item are spammers, an item may also be excluded from the interest burst item list if that nature of the item itself indicates that the item is spam.

For example, in one embodiment, where the items are pages, the server uses obtains an adult page value (which indicates how that likelihood that the page contains adult content) and link flux value of saved pages (which indicates how many other pages have links to the page). Based on this information, the server determines the quality of the pages. In addition, the server may also scan the tags, title, URL, keywords of saved pages to check if they contain blocking words to exclude spam pages and adult pages.

If the server determines that a page is spam, or has a quality value that falls below a certain threshold, the page may be excluded from the interest burst list even though the page would otherwise qualify to be included.

Feature Vectors

Each of the spam detection methods described above may be used by the server individually, or in combination with any of the other methods. According to one embodiment, the results of each of the spam determinations for a given item are used together as a feature vector to classify the items in feature vector space. Based on the classification of each item, the server may decide whether the item should be excluded from the interest burst item list.

Tag Example

As mentioned above, the techniques described herein may be applied to identify any type of item that has undergone a recent interest burst. In the preceding examples, the techniques were described in the context in which the items are web pages and the interest-actions are the bookmarking of the web pages. In another context, the items may be tags, and the interest-actions are using the tags to tag URLs.

In the context of tags, spammers tend to create many accounts to spam popular tags. Each account tags a large number of URLs. The goal of a tag spammer is typically to boost tags into the popular top tag list, and tag any pages including irrelevant pages with their top tags.

To fight such kind of spam, the server computes the popularity of a tag in a given window as follows.

1) the server defines the weight of a tag-document pair for a given user $w(u, t, d)$ as $1/|tag(u, d)|$, where $|tag(u, d)|$ is the total number of tags that the user u has assigned to the given document d. The intuition is that the more tags a document has, the less importance each tags gets.

2) For a given tag and document pair (t, d), the quality of the pair $w(t, d)$ is measured as $\Sigma_u R(u)*w(u, t, d)$, where $R(u)$ is the reputation of the user u. How to compute $R(u)$ is described in greater detail hereafter.

3) The popularity of a tag t in a given time window I is the $\Sigma_d w(t, d)$, given that d is tagged with t in the given window.

According to one embodiment, the server computes reputation of a user as follows:

1) Randomly sample a small number of documents saved by the user

2) For each sampled document, the tag quality of the document is measured as the overlap of the user's tags and the suggested tags. Suggested tags are computed based on tags contributed by all users to a given object. These are the tags that most representative of the object. In principle, the algorithm uses other users tags to cross check a given user's tag.

3) The reputation of the user is computed as the average quality of their tags normalized according to the number of document that this user has saved.

For a user to have a good reputation, he or she will have to tag a large percentage of his/her saved documents "correctly".

Interest and Spam History

The techniques described herein can be extended to record the interest burst on URLs or tags in the entire life-time of a product. Users can go back to arbitrary points in history to identify times when interesting events had happened.

The window based algorithms described herein can also be used to record interest bursts in the history. In one embodiment, the system uses the techniques described herein to record a fixed number of time points that an object had the highest activities.

If a Web page is detected as a spam page, the server can record the page and the domain in database, which can be used in the future to detect spammers. If a user saves lots of spam pages, the user is probably a spammer.

Hardware Overview

Figure 2:
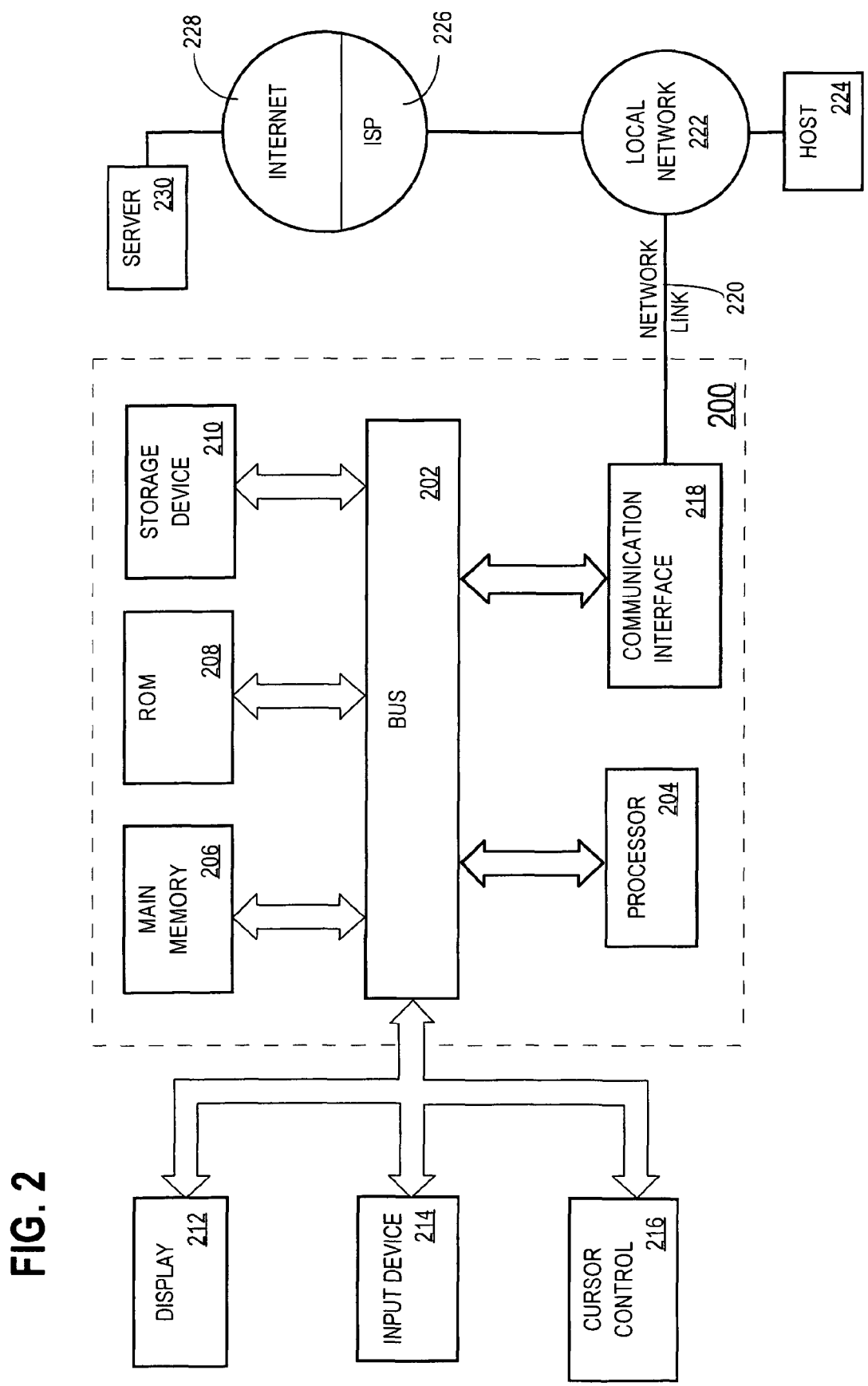
FIG. 2 is a block diagram of a computer system upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for identifying items that have experienced interest bursts, comprising the computer-implemented steps of:
   for each item of a plurality of items, one or more computing devices performing the steps of:
   during a particular window of time, maintaining an interest value based on how many interest-actions are performed on said item by a plurality of users during said particular window of time; and
   determining whether the item has experienced an interest burst for the particular window based, at least in part, on the interest value and a historical indication of interest for the item;

wherein the plurality of items includes:
at least one item, for which multiple interest-actions were performed during the particular window, that experienced an interest burst during the particular window; and
at least one item, for which multiple interest-actions were performed during the particular window, that did not experience an interest burst during the particular window;
wherein the particular window is one of a plurality of windows of time;
wherein the historical indication of interest is based on at least some interest values maintained for windows, of the plurality of windows, that began prior to the particular window;
wherein the at least one item that experienced an interest burst had fewer interest-actions performed on the at least one item during at least some windows, of the plurality of windows, that began prior to the particular window.

2. The method of claim 1 wherein the plurality of items are tags.

3. The method of claim 2 wherein the interest value for a given tag is based, at least in part, on reputation values associated with users that performed interest-actions on the given tag during the particular window of time.

4. The method of claim 2 wherein:
the interest value for a given tag reflects a particular interest-action in which a particular user assigned the given tag with a document during the particular window of time, and
the method includes assigning to said particular interest-action a weight that is based, at least in part, on how many other tags the particular user assigned to said particular document.

5. The method of claim 1 wherein:
the particular window of time is a first window;
the step of determining whether the item has experienced an interest burst based, at least in part, on the interest value and a historical indication of interest for the item, is performed prior to the end of the first window;
the method further comprises the steps of:
during the first window, maintaining a second interest value based on how many interest-actions were performed on said item during a second window of time that begins during the first window; and
after the end of the first window, determining whether the item has experienced an interest burst based, at least in part, on the second interest value and a historical indication of interest for the item.

6. The method of claim 1 wherein the step of determining whether the item has experienced an interest burst is also based, at least in part, on whether the interest value is greater than a predetermined minimum threshold.

7. The method of claim 1 wherein the step of determining whether the item has experienced an interest burst is also based, at least in part, on whether the interest value is less than a predetermined maximum threshold.

8. The method of claim 1 wherein:
the interest-actions include private interest-actions and public interest-actions; and
the step of determining whether the item has experienced an interest burst is also based, at least in part, on whether the number of public interest-actions is greater than a predetermined threshold.

9. The method of claim 1 further comprising:
ranking those items that have experienced an interest burst;
generating a list that includes the highest-ranked items that have experienced an interest burst; and providing the list for display to a user over a network.

10. The method of claim 9 wherein:
the step of ranking those items that have experienced an interest burst is based on scores generated for the items;
the score for each of the items is generated based on the interest value for the item;
the historical indication for the item; and
a number of windows that preceded the particular window.

11. The method of claim 1, further comprising:
concurrently maintaining a plurality of count sets, wherein each count set indicates interest-actions that are performed on items of the plurality of items during a window of the plurality of windows;
determining which of said plurality of windows is a current window, wherein the current window is an active window with an earliest start time of the plurality of windows;
determining which items have experienced interest bursts based, at least in part, on interest values in the count set associated with the current window;
at the end of the current window, determining which of said plurality of windows is a new current window, wherein the new current window is an active window with an earliest start time of the plurality of windows other than the current window; and
after the current window has ended, determining which items of the plurality of items have experienced interest bursts based, at least in part, on interest values in the count set associated with the new current window.

12. The method of claim 11 further comprising, in response to the end of the current window:
starting a new window;
resetting the interest values in the count set associated with the current window; and
using the count set associated with the new window to begin counting interest-actions for the new window.

13. The method of claim 1, further comprising:
identifying a set of interest burst item candidates by performing the steps of maintaining and determining for each item of the plurality of items;
for each item in the set of interest burst item candidates, determining whether the interest burst experienced by the item is likely to have been the result of spamming;
ranking the items in the set of interest burst item candidates, wherein the ranking of each item is based, at least in part, on whether the interest burst experienced by the item is likely to have been the result of spamming;
generating a list that include the highest-ranked items that have experienced an interest burst; and providing the list for display to a user over a network.

14. The method of claim 13 wherein determining whether the interest burst experienced by the item is likely to have been the result of spamming includes performing a least one test to detect whether a particular user that performed interest actions related to the item is likely to be a spammer.

15. The method of claim 13 wherein determining whether the interest burst experienced by the item is likely to have been the result of spamming includes performing a least one test to detect whether a plurality of users that performed interest actions related to the item are likely to have cooperated to spam the item.

16. The method of claim 15 wherein performing a least one test to detect whether a plurality of users that performed interest actions related to the item are likely to have cooperated to spam the item includes performing a test based on registration times of the plurality of users.

17. The method of claim 15 wherein performing a least one test to detect whether a plurality of users that performed interest actions related to the item are likely to have cooperated to spam the item includes performing a test based on similarity between user identifiers of the plurality of users.

18. The method of claim 15 wherein performing a least one test to detect whether a plurality of users that performed interest actions related to the item are likely to have cooperated to spam the item includes performing a test based on similarity between interest-actions of the plurality of users.

19. The method of claim 13 wherein determining whether the interest burst experienced by the item is likely to have been the result of spamming includes performing a least one test to detect whether content of the item indicates that the item is likely to be spam.

20. A non-transitory computer-readable storage medium storing one or more sequences of instructions which, when executed by one or more processors, causes the one or more processors to perform:
 for each item of a plurality of items, one or more computing devices performing the steps of:
  during a particular window of time, maintaining an interest value based on how many interest-actions are performed on said item by a plurality of users during said particular window of time; and
  determining whether the item has experienced an interest burst for the particular window based, at least in part, on the interest value and a historical indication of interest for the item;
 wherein the plurality of items includes:
  at least one item, for which multiple interest-actions were performed during the particular window, that experienced an interest burst during the particular window; and
  at least one item, for which multiple interest-actions were performed during the particular Window, that did not experience an interest burst during the particular window;
 Wherein the particular window is one of a plurality of windows of time;
 wherein the historical indication of interest is based on at least some interest values maintained for windows, of the plurality of windows, that began prior to the particular window;
 wherein the at least one item that experienced an interest burst had fewer interest-actions performed on the at least one item during at least some windows, of the plurality of windows, that began prior to the particular window.

21. A non-transitory computer-readable storage medium as recited in claim 20, wherein the plurality of items are tags.

22. A non-transitory computer-readable storage medium as recited in claim 21, wherein the interest value for a given tag is based, at least in part, on reputation values associated with users that performed interest-actions on the given tag during the particular window of time.

23. A non-transitory computer-readable storage medium as recited in claim 21, wherein:
 the interest value for a given tag reflects a particular interest-action in which a particular user assigned the given tag with a document during the particular window of time, and
 the instructions, when executed by one or more processors, further cause assigning to said particular interest-action a weight that is based, at least in part, on how many other tags the particular user assigned to said particular document.

24. A non-transitory computer-readable storage medium of claim 20, wherein:
 the particular window of time is a first window;
 the instructions, when executed by one or more processors, cause determining whether the item has experienced an interest burst based, at least in part, on the interest value and a historical indication of interest for the item, is performed prior to the end of the first window;
 wherein the instructions, when executed by one or more processors, further cause:
  during the first window, maintaining a second interest value based on how many interest-actions were performed on said item during a second window of time that begins during the first window; and
  after the end of the first window, determining whether the item has experienced an interest burst based, at least in part, on the second interest value and a historical indication of interest for the item.

25. A non-transitory computer-readable storage medium as recited in claim 20, wherein the instructions, when executed by one or more processors, cause determining whether the item has experienced an interest burst also based, at least in part, on whether the interest value is greater than a predetermined minimum threshold.

26. A non-transitory computer-readable storage medium as recited in claim 20, wherein the instructions, when executed by one or more processors, cause determining whether the item has experienced an interest burst also based, at least in part, on whether the interest value is less than a predetermined maximum threshold.

27. A non-transitory computer-readable storage medium of claim 20, wherein:
 the interest-actions include private interest-actions and public interest-actions; and
 wherein the instructions, when executed by one or more processors, cause determining whether the item has experienced an interest burst also based, at least in part, on whether the number of public interest-actions is greater than a predetermined threshold.

28. A non-transitory computer-readable storage medium as recited in claim 20, wherein the instructions, when executed by one or more processors, further cause:
 ranking those items that have experienced an interest burst; generating a list that includes the highest-ranked items that have experienced an interest burst; and providing the list for display to a user over a network.

29. A non-transitory computer-readable storage medium as recited in claim 28, wherein the instructions, when executed by one or more processors, cause ranking those items that have experienced an interest burst based on scores generated for the items;
 wherein the score for each of the items is generated based on the interest value for the item;
 the historical indication for the item; and a number of windows that preceded the particular window.

30. A non-transitory computer-readable storage medium as recited in claim 20, wherein the instructions, when executed by one or more processors, further cause:
 concurrently maintaining a plurality of count sets, wherein each count set indicates interest-actions that are performed on items of the plurality of items during a window of the plurality of windows; determining which of said plurality of windows is a current window, wherein the current window is an active window with an earliest start time of the plurality of windows;

determining which items have experienced interest bursts based, at least in part, on interest values in the count set associated with the current window;

at the end of the current window, determining which of said plurality of windows is a new current window, wherein the new current window is an active window with an earliest start time of the plurality of windows other than the current window; and after the current window has ended, determining which items of the plurality of items have experienced interest bursts based, at least in part, on interest values in the count set associated with the new current window.

31. A non-transitory computer-readable storage medium as recited in claim 30, wherein the instructions, when executed by one or more processors, cause, in response to the end of the current window:

starting a new window;

resetting the interest values in the count set associated with the current window; and using the count set associated with the new window to begin counting interest-actions for the new window.

32. A non-transitory computer-readable storage medium as recited in claim 20, wherein the instructions, when executed by one or more processors, further cause:

identifying a set of interest burst item candidates by performing the steps of maintaining and determining for each item of the plurality of items;

for each item in the set of interest burst item candidates, determining whether the interest burst experienced by the item is likely to have been the result of spamming;

ranking the items in the set of interest burst item candidates, wherein the ranking of each item is based, at least in part, on whether the interest burst experienced by the item is likely to have been the result of spamming;

generating a list that include the highest-ranked items that have experienced an interest burst; and providing the list for display to a user over a network.

33. A non-transitory computer-readable storage medium as recited in claim 32, wherein the instructions, when executed by one or more processors, cause determining whether the interest burst experienced by the item is likely to have been the result of spamming at least in part by performing at least one test to detect whether a particular user that performed interest actions related to the item is likely to be a spammer.

34. A non-transitory computer-readable storage medium as recited in claim 32, wherein the instructions, when executed by one or more processors, cause wherein determining whether the interest burst experienced by the item is likely to have been the result of spamming at least in part by performing at least one test to detect whether a plurality of users that performed interest actions related to the item are likely to have cooperated to spam the item.

35. A non-transitory computer-readable storage medium as recited in claim 34, wherein the instructions, when executed by one or more processors, cause performing at least one test to detect whether a plurality of users that performed interest actions related to the item are likely to have cooperated to spam the item at least in part by performing a test based on registration times of the plurality of users.

36. A non-transitory computer-readable storage medium as recited in claim 34, wherein the instructions, when executed by one or more processors, cause performing at least one test to detect whether a plurality of users that performed interest actions related to the item are likely to have cooperated to spam the item at least in part by performing a test based on similarity between user identifiers of the plurality of users.

37. A non-transitory computer-readable storage medium as recited in claim 34, wherein the instructions, when executed by one or more processors, cause performing at least one test to detect whether a plurality of users that performed interest actions related to the item are likely to have cooperated to spam the item at least in part by performing a test based on similarity between interest-actions of the plurality of users.

38. A non-transitory computer-readable storage medium as recited in claim 32, wherein the instructions, when executed by one or more processors, cause determining whether the interest burst experienced by the item is likely to have been the result of spamming at least in part by performing at least one test to detect whether content of the item indicates that the item is likely to be spam.

39. The method of claim 1, wherein determining whether the item has experienced an interest burst based, at least in part, on the interest value and a historical indication of interest for the item comprises determining whether the interest value is greater than a particular fraction of the historical indication of interest for the item.

40. A non-transitory computer-readable storage medium as recited in claim 20, wherein the instructions, when executed by one or more processors, cause determining whether the item has experienced an interest burst based, at least in part, on the interest value and a historical indication of interest for the item at least in part by causing determining whether the interest value is greater than a particular fraction of the historical indication of interest for the item.

41. The method of claim 1, wherein determining whether the item has experienced an interest burst based, at least in part, on the interest value and a historical indication of interest for the item comprises comparing current interest in the item to past interest in the item;

wherein current interest in the item is determined based, at least in part, on the interest value of the item; and wherein past interest in the item is determined, at least in part, on the historical indication of interest for the item.

42. A non-transitory computer-readable storage medium as recited in claim 20, wherein the instructions, when executed by one or more processors, cause determining whether the item has experienced an interest burst based, at least in part, on the interest value and a historical indication of interest for the item at least in part by causing comparing current interest in the item to past interest in the item; wherein current interest in the item is determined based, at least in part, on the interest value of the item; and wherein past interest in the item is determined, at least in part, on the historical indication of interest for the item.

* * * * *